United States Patent [19]

Chiang

[11] Patent Number: 5,030,953
[45] Date of Patent: Jul. 9, 1991

[54] CHARGE DOMAIN BLOCK MATCHING PROCESSOR

[75] Inventor: Alice M. Chiang, Weston, Mass.

[73] Assignee: Massachusetts Institute of Technology, Cambridge, Mass.

[21] Appl. No.: 551,947

[22] Filed: Jul. 11, 1990

[51] Int. Cl.[5] .......................... H03M 7/00; G06J 1/00
[52] U.S. Cl. .................................. 341/172; 364/602; 358/105; 365/49; 365/183
[58] Field of Search ......................... 365/194, 183, 49; 341/172, 150; 358/11, 12, 105, 140, 141; 364/602, 604, 606, 862

[56] References Cited

U.S. PATENT DOCUMENTS

| | | | |
|---|---|---|---|
| 4,264,983 | 4/1981 | Miller | 364/862 |
| 4,313,159 | 1/1982 | Shoap | 364/200 |
| 4,354,257 | 10/1982 | Varshney et al. | 365/183 X |
| 4,464,726 | 8/1984 | Chiang | 34/172 X |
| 4,514,821 | 4/1985 | Tower | 364/862 |
| 4,625,293 | 11/1986 | Vogelsong et al. | 341/172 X |
| 4,669,055 | 5/1987 | Berger et al. | 364/862 |
| 4,760,558 | 7/1988 | Berger | 365/183 |
| 4,922,452 | 5/1990 | Larsen et al. | 365/194 X |

Primary Examiner—A. D. Pellinen
Assistant Examiner—H. L. Williams
Attorney, Agent, or Firm—Thomas J. Engellenner; Mark G. Lappin

[57] ABSTRACT

A full search block matching algorithm includes a charge-domain serial tapped delay line as an input buffer, and an array of charge domain signal processors. The delay line shifts and holds analog sampled data which are in the form of charge packets. At each stage of delay, the signals are nondestructively sensed and coupled to a corresponding signal processor, and the sampled data are transferred and subsequently processed in parallel. The processed data from all the processors can be read out either in a parallel or serial format through a parallel-in-serial-out output buffer. In this structure, only the serial input buffer has to be clocked at the system throughout rate; the internal clock rate of each processor is reduced by the number of parallel processors. Within each processor, all of the computation functions are performed in the charge domain, and local charge domain memories are included for storing the processed signal.

8 Claims, 3 Drawing Sheets

CHARGE DOMAIN BLOCK MATCHING PROCESSOR

BACKGROUND OF THE INVENTION

The present invention is in the field of integrated circuit networks and more particularly directed to charge domain processing networks.

The need for transmitting data representative of an image through a relatively low data-rate channel is the driving force for the development of video bandwidth compression techniques. There are two basic classes of video compression algorithms: intraframe and interframe coding. Intraframe coders are effective to remove spatial redundancy from within respective video frames. Interframe coders generally use some form of predictive coding based on the information in a previous frame to remove redundancy between frames. Tremendous advantages are gained by incorporating motion detection and compensation (MDC) in an interframe coder. This is due to the fact that, in an area where motion is occurring, a better prediction can be formed based on the direction of motion. Transform image coding based on the discrete cosine transform (DCT) algorithm has been shown to provide good-quality, low-bit-rate image transmission. A hybrid interframe/intraframe coder offers the potential for achieving a higher bit-rate reduction.

Devices implementing such techniques are particularly advantageous, for example, in high-definition television (HDTV) receivers capable of accommodating different transmission formats and different field rates, and for low-bit-rate video communications in general. In video receivers, the use of MDC permits implementation of efficient interpolation algorithms to reconstruct missing fields following the use of temporal subsampling to reduce transmission bandwidth.

In automatic target tracking applications of video systems, it is important to detect the displacement of objects between pairs of successive image frames. Such signal processing generally requires a real-time motion detection and estimation (MDE) device for optimum performance.

The development of improved television systems is presently being limited by the use of different field rate standards. At present, there are three international television standards: the National Television System Committee (NTSC), the Phase Alternating Line (PAL) and the Sequential Couleur a Memoire (SECAM). The problem of frame conversion between different standards arises when there is no integral relationship between the two field rates; it is necessary to construct pictures for intermediate times. Linear interpolation without motion compensation would degrade the picture quality. While motion-compensated transcoding between PAL and NTSC has become technically quite successful, the transcoders are very expensive because temporal interpolation is required. The luminance resolution of the future HDTV is at least four times better than the NTSC system; to transcode such a high resolution video between different standards requires a temPoral interpolation processor capable of performing more than 16 billion operations/s. The availability of a low-cost field-rate converter would considerably simplify the trade-offs between different transmission formats.

An important aspect of most efficient MDC and MDE techniques is the applying a full search block matching algorithm (BMA) to an array of signal elements representative of an image frame. The BMA effectively passes a subarray, or template, of data values over the larger full array and identifies the particular location of the subarray which provides the highest spatial correlation (i.e. best match) of the subarray to the underlying array. In typical applications, the full array may be a $31 \times 31$ pixel rectangular array, and the template may be a $16 \times 16$ pixel rectangular array. By way of example, the computational requirement for motion compensation coding with a $16 \times 16$ full-search BMA is 3.8 billion computations/s for present NTSC video, and is expected to be on the order of 16 billion computations/s for future HDTV signals. For a digital HDTV transmitter and receiver, this computation rate requirement is near the upper limit of present digital technology, and consequently would result in highly complex and correspondingly costly equipment.

Accordingly, it is an object of the present invention to provide an improved charge domain processing network.

Another object is to provide a charge domain full search block matching algorithm processing system.

SUMMARY OF THE INVENTION

The present invention is a full search block matching charge domain processor for determining the best matching $m \times n$ element subarray of an $M \times N$ element array with an $m \times n$ element template, where $m \leq M$ and $n \leq N$.

The processor indicates a tapped delay line, a template network, m groups of n absolute magnitude difference (AMD) networks, m groups of n summing networks, m accumulator networks, a column accumulator network, and a column minimum difference network. In this preferred form, all of these elements are charge domain devices, but one or more may have other forms.

The charge domain tapped delay line includes at least $(m \times n) + (m-1) \times (N-n)$ stages and has a serial input channel and m groups of n parallel output channels. Each of the n output channels in each group is coupled to an associated one of n successive stages in a corresponding group of stages in the delay line, and each of the groups of n successive stages in the delay line is separated by $N-n$ successive stages in the delay line.

The delay line is adapted for establishing a succession of at least $m \times n$ charge packets therein in response to a succession of applied input signals, where each of the packets has a magnitude corresponding to an associated one of a corresponding succession of elements of the array. The charge packets may be selectively shifted from stage-to-stage along the delay line at an input rate.

Each of N floating gate sensing electrodes overlies one of the stages and is adapted to provide a potential thereon representative of the magnitude of a charge packet currently within its underlying stage, where the potential is a search signal associated with the electrode.

The template network includes a charge storage region and is adapted for establishing a succession of $m \times n$ charge packets in that storage region at the input rate, where each of the packets has a magnitude corresponding to an associated element in the template. A floating gate sensing electrode overlies the storage region and is adapted to provide a potential thereon representative of the magnitude of a charge packet currently underlying the electrode, where the potential is a template signal.

Each AMD network of the m groups of n charge domain AMD networks, has a template input port, a search input port, and a charge domain output port. Each of the n AMD networks of each of the groups has its search input port coupled to an associated sensing electrode of an associated group of the output channels of the delay line, and has its template input port coupled to the sensing electrode of the template network. Each of the AMD networks provides at its output port a succession of charge packets at the input rate, where each of the charge packets is representative of the absolute magnitude of the difference between the current one of the search signals at its search input port and the current one of the template signals at the template input port.

Each of the summing networks is associated with an AMD network in an associated one of the m groups of AMD networks, and each provides at an output thereof a succession of output charge packets at a summing rate equal to $1/(m \times n)$ times the input rate. Each of these output charge packet has a magnitude representative of the sum of the magnitude of $m \times n$ successive charge packets provided at the output port of its associated AMD network.

Each row accumulator network is associated with one of the m groups of n AMD networks, and substantially simultaneously receives the output charge packets of its associated n summing networks at distinct locations in the row accumulator network.

The received charge packets are transferred to establish a succession of the output charge packets at an output port thereof at an accumulator rate equal to $1/m$ times the input rate.

The column accumulator network is associated with the m row accumulator networks. That network substantially simultaneously receives the succession of output charge packets of said m row accumulator networks at distinct locations in the column accumulator network, and transfers those received charge packets to establish a succession of output charge packets at an output port thereof at a rate equal to the input rate.

The charge domain column minimum difference network is associated with the column accumulator network, and is adapted to store a charge packet therein. The succession of said output charge packets is received one at a time at the input rate, and at the receipt of each of the charge packets, retains and stores only the smaller magnitude one of the just received charge packet and the next previously stored charge packet.

The magnitude of the charge packet stored at the column MD network is representative of the best matching $m \times n$ subarray of the elements that have been represented by charge packets in the delay line.

In an alternative form, separate row minimum difference (MD) networks may be associated with each of the M row accumulator networks and be adapted to store a charge packet therein. Each row MD network receives the succession of output charge packets one at a time at the accumulator rate, and at the receipt of each charge packet, retains and stores only the smaller magnitude one of the just received charge packet and a previously stored charge packet.

In the latter form of the invention, the output from the respective row MD networks are received at the distinct locations in the column accumulator network. Upon receipt, those charge packets are transferred in succession to the output part of that accumulator at the accumulator (i.e. relatively low) clock rate. The column MD network operates as described above to identify the best match.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
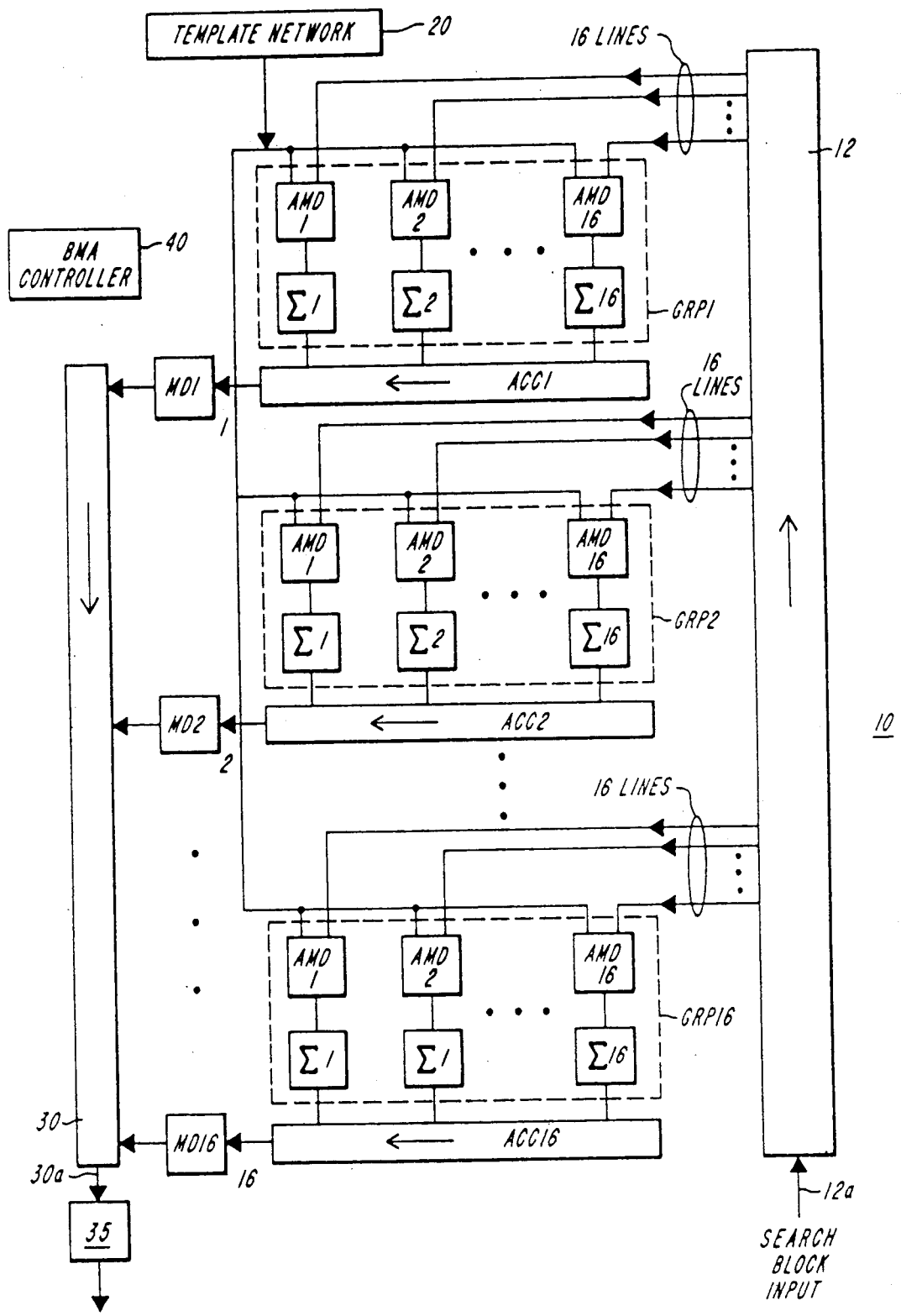
FIG. 1 shows in schematic block diagram form, a charge domain processing system embodying the present invention.

The preferred embodiment of the invention is a very large scale integration (VLSI) implementation of a motion detection and estimation video processor. Motion estimation and compensation techniques have a wide range of applications in the video signal processing area, including video signal coding in order to remove redundancy along the temporal domain, and therefore, to reduce transmission bit-rates. In a motion compensation (MC) predictive algorithm, the displacement of objects is estimated from one field, or frame, to the next. A prediction is then formed in the direction of the motion. This process gives lower prediction errors than does a standard interframe prediction process, i.e., a process with no motion compensation. MC systems have been used to transmit television broadcast signals and to code video conferencing signals.

In a block-match MC system, the current array of pixels, or frames, in a video sequence is segmented into subarrays, or blocks. Each block is compared to blocks in the previous frame within a search area to detect the displacement or the motion of objects. According to a matching criterion, such as the mean of the absolute difference (MAD) or the mean-square-error, a motion vector is extracted for each block. With the motion-vector information, a receiver can reconstruct the current frame using the available previous frame data and the coded frame difference (as determined by the best matched block). Among several possible searching algorithms, full search, which searches all possible blocks within the tracking range in the previous frame, gives the most accurate estimation of the motion vector. However, the full-search block-matching method requires a large number of computations. For example, for a given $16 \times 16$-pixel block $X_{m,n}$ in the present frame, and a $31 \times 31$-pixel search area $Y_{m+i,n+j}$ in the previous frame, the displacement vector (i,j) is determined by the minimum of the distortion function D:

$$D(i,j) = \sum_{m=1}^{16} \sum_{n=1}^{16} d(X_{m,n}, Y_{m-i,n-j})$$

where $d(x,y) = |x-y|$ (MAD) for every possible displacement i and j. For a frame size of $1024 \times 1024$ pixels and a frame rate of 30 frames/s, the search requires about 16 billion operations and 8 billion data accesses per second.

The preferred form of the present invention implements the full search BMA. That embodiment includes a charge-domain serial tapped delay line as an input buffer, and an array of charge domain signal processors. The delay line shifts and holds analog sampled data which are in the form of charge packets. At each stage of delay, the signals are nondestructively sensed and coupled to a corresponding signal processor, and the sampled data are transferred and subsequently processed in parallel. The processed data from all the processors can be read out either in a parallel or serial format through a parallel-in-serial-out output buffer. In this structure, only the serial input I buffer has to be clocked at the system throughput rate; the internal clock rate of each processor is reduced by the number of parallel processors. Within each processor, all of the computation functions are performed in the charge domain, and local charge domain memories are included for storing the processed signal.

The preferred embodiment, charge domain full search BMA processing system 10, is shown in schematic block diagram form in FIG. 1. System 10 is adapted to determine the best matching $m \times n$ element subarray of an $M \times N$ element array with an $m \times n$ template, where $m \leq M$ and $n \leq N$. In the illustrated embodiment, $m = n = 16$ and $M = N = 31$.

The system 10 includes a charge domain tapped delay line 12, a template network 20, $m(=16)$ groups (denoted GRP1 through GRP16 in FIG. 1) of $n(=16)$ charge domain absolute magnitude difference (AMD) networks (denoted AMD1 through AMD16 in each of the groups), 16 groups (denoted GRP1 through GRP16 in FIG. 1) of 16 charge domain summing networks (denoted $\Sigma 1$ through $\Sigma 16$ in each of the groups), 16 charge domain row accumulator networks (denoted ACC1 through ACC16), 16 charge domain row minimum detector networks (denoted MD1 through MD16), a charge domain column accumulator network 30, a charge domain column minimum detector network 35, and a BMA controller 40.

The tapped delay line 12 has the same general configuration as the tapped delay line disclosed in U.S. Pat. No. 4,464,726, and generally includes at least $(m \times n) + (m-1) \times (N-n)$ stages. A serial input is provided at line 12a for receiving a succession of applied values representative of the $M \times N$ elements of the current frame array. Those values are clocked through the delay line 12 at an input rate $R_o$ (in response to an input clock signal generated by controller 40).

Delay line 12 has $m(=16)$ groups of $n(=16)$ parallel output channels, each group of channels being associated with a corresponding group of successive stages of line 12, where each group is separated by $N-n$ successive stages in the delay line 12. With this configuration, as the input data is clocked through delay line 12, the values (charge packets) at the output channels of line 12 correspond to that which would result from sliding an $m \times n$ window (or patch) over the $M \times N$ data array, as in the configurations disclosed in U.S. Pat. No. 4,313,159. The respective output channels from delay line 12 establish charge packets under the search input of an associated AMD network.

As the input data is passed through the delay line 12 at rate $R_o$, the template network 20 generates at that same rate, a succession of template values corresponding to the values of the $m \times n$ subarray (or block) from the previous frame. Those values establish a succession of charge packets under the template input in each of the AMD networks in groups 1 through 16.

During each clock period of the $R_o$ input clock signal, each AMD network provides at its output port a charge packet representative of the absolute magnitude of the difference of the magnitudes of the charge packets at the search input and the template input. Each of these charge packets is applied to an associated one of the summing networks.

For a period corresponding to $m \times n (=256)$ input clock periods, the charge packets are accumulated in a summing network associated with each AMD network to provide a composite charge packet at its output having a magnitude substantially equal to the sum of the magnitudes of the charge packets provided by the AMD network during those $m \times n$ input clock periods.

Each summing network in each group applies its output charge packet to an associated one of the $m(=16)$ charge domain row accumulator networks, at correspondingly positioned locations along the accumulator. Under the control of a row accumulator clock signal (at a "row accumulator rate" equal to $1/m$ times the input rate $R_o$) from controller 40, the received charge packets in all of the row accumulators are stepped together through the accumulators so that a succession of those charge packets are provided at the output ports of those accumulators.

The row minimum detector networks, MD1 through MD16, each operate to receive the succession of charge packets from its associated row accumulator network. Upon receipt of each charge packet, a row MD network compares the magnitude of that just received packet with a stored charge packet from the previous accumulator clock period, and stores the lesser-magnitude charge packet and dispenses with the greater-magnitude charge packet. This process repeats for $n(=16)$ accumulator clock periods so that at the end of that process, each MD network has stored the minimum magnitude charge packet received from all of the summing networks of its associated group.

At the end of each set of $n(=16)$ accumulator clock periods, the charge packets stored in each of the row MD networks are transferred to correspondingly positioned locations in the column accumulator 30, and then those charge packets are stepped together at the accumulator clock rate $(1/m \times R_o)$ through accumulator 30 and applied by way of an output port 30a to the column minimum detection network 35.

The column minimum detector network 35 is similar to each of the row minimum detector networks. That detector 35, after $m(=16)$ input clock periods, stores or retains only the minimum magnitude one of charge packets that had been loaded into column accumulator 30. This stored charge packet is representative of the best match of all of the positions of the $m \times n$ subarray over the full $M \times N$ array.

During the above-described operation, the controller 40 provides the appropriate clock signals to accomplish the various charge transfer operations. In addition, the controller 40 tracks the various charge packets identified by the respective row and column minimum detection networks so that "position" of the $m \times n$ subarray is known for the particular charge packet that is ultimately determined to be the best match (i.e. the packet stored at minimum detection network 35).

Figure 1A:
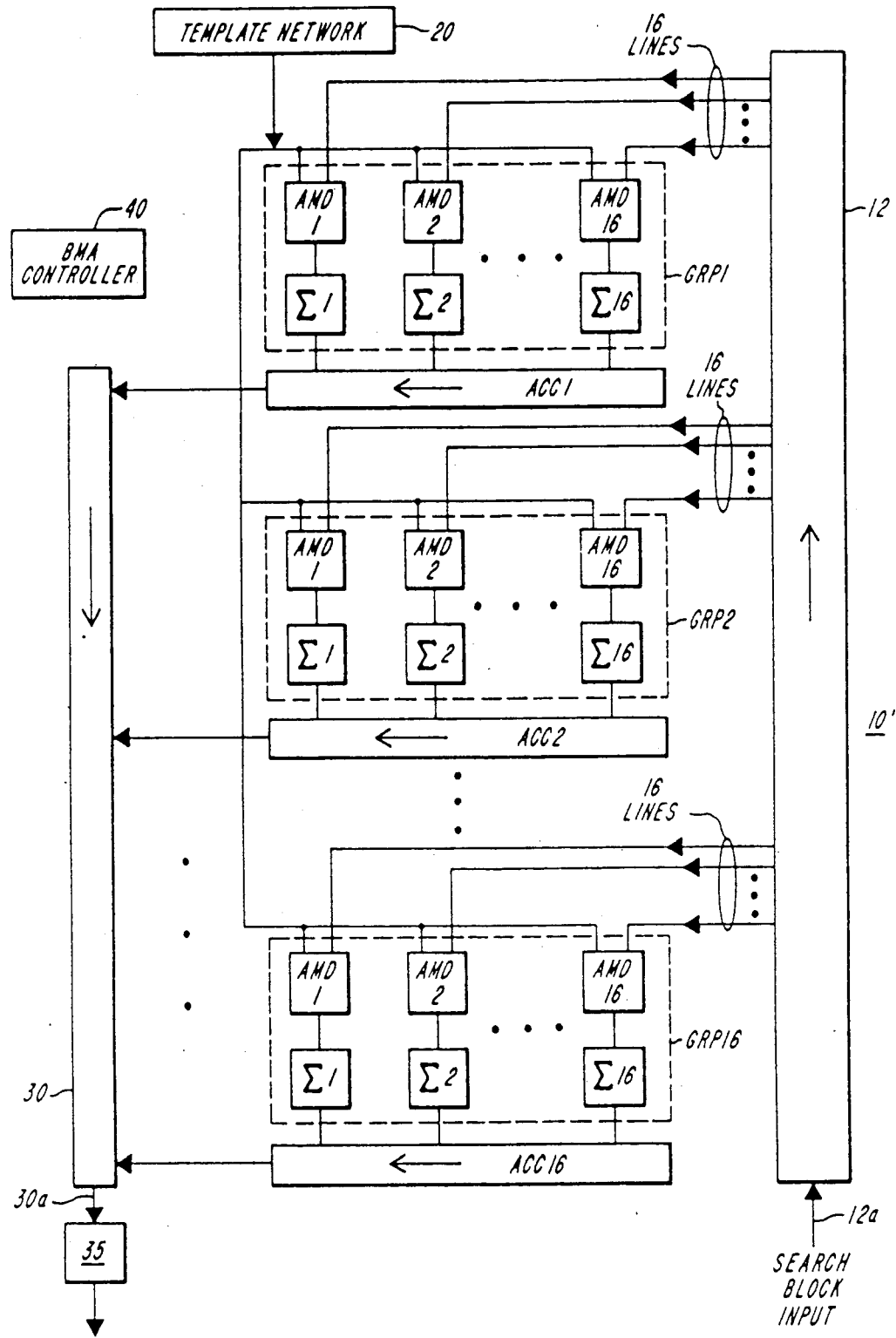
FIG. 1A shows in schematic block diagram from, an alternative charge domain processing system embodying the invention.

An alternative system 10' embodying the invention is shown is FIG. 1A, where elements corresponding to elements in the embodiment of FIG. 1 are denoted by the same reference numerals. The system 10' is substantially the same as the system 10, except that there are no elements corresponding to minimum detection (MD) networks MD1-MD16. In system 10, the output charge packets from row accumulators ACC1-ACC16 are loaded directly into their respective locations in column accumulator 30. The stored Packets in the column accumulator 30 are then clocked through the accumulator 30 at the input rate $R_o$ to the column minimum detector network 35. Thus, the system 10' requires a high clock rate ($R_o$) column accumulator 30 and minimum detector network (compared to the system 10 which utilizes a low clock rate ($1/m \times R_o$) column accumulator 30 and minimum detector network 35), but it eliminates the need for the row minimum detectors networks (corresponding to MD1-MD16 in system 10), i.e. only a single minimum detector network 35 is required.

Figure 2:
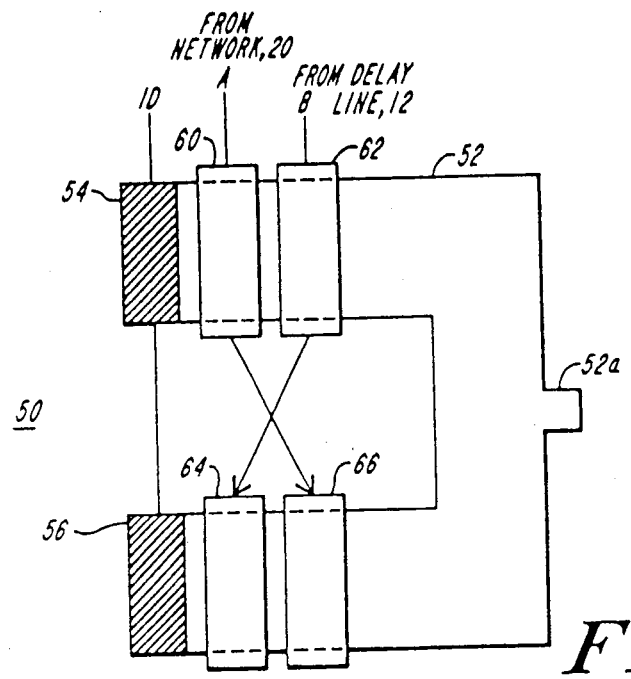
FIG. 2 shows in schematic block diagram form an absolute magnitude difference minimum detection network of the system of FIG. 1.

By way of example, a preferred form of a charge domain absolute magnitude difference network is shown schematically in FIG. 2. The illustrated network, denoted by reference designation 50, is a two input channel device. Network 50 includes a U-shaped charge transport medium 52 having one of charge injection diodes 54 and 56 positioned at each end. A first pair of gate electrodes 60 and 62 overlies a first leg of the U-shaped medium 52 with gate 60 being between diode 54 and gate 62, and a second pair of gate electrodes 64 and 66 overlies the second leg of the medium 52 with gate 64 being between diodes 56 and gate 66. Gates 60 and 66 are electrically coupled together and also to template network 20, thereby coupling a template signal to device 50. Gates 62 and 64 are electrically coupled together and also to the associated one of the output channels from tapped delay line 12, thereby coupling a search signal to device 50.

With this configuration, a charge packet is provided at the output portion 52a of medium 52, which packet has a magnitude proportional to the absolute magnitude of the difference between the template signal at gates 60 and 66 and the search signal at gates 62 and 64.

Figure 3:
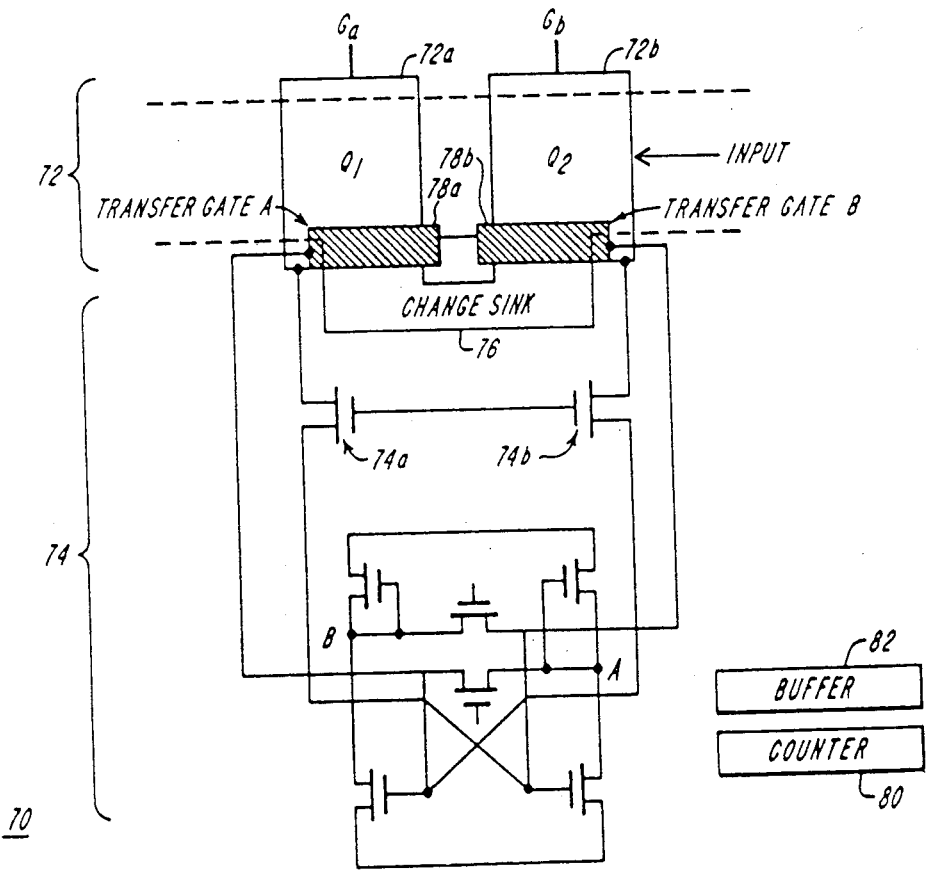
FIG. 3 shows in schematic block diagram form, a minimum detection network of the system of FIG. 1.

Also, by way of example, a preferred form of a charge domain minimum detection network is shown schematically in FIG. 3. The illustrated network, denoted by reference designation 70, can detect and store the smallest of a succession of applied charge packets at a clock rate. At each clock period, the network 70 examines a previously stored charge packet and a currently applied charge packet, and detects and stores the smaller packet, and discards the larger packet. An associated buffer 82 and digital counter 80 keep track of the identity (i.e. time of receipt) of the stored packet.

The network 70 includes a two stage CCD tapped delay line 72 having floating gate sensing electrodes 72a and 72b, an FET flip-flop 74, a charge sink 76, and transfer gates 78a and 78b coupled to an associated one of sensing electrodes 72a and 72b. Each of electrodes 72a and 72b is coupled by way of an associated one of FET's 74a and 74b to an associated input of the flip-flop 74. The outputs A and B of flip-flop 74 are coupled to associated ones of charge domain transfer gates 78a and 78b. The output A of flip-flop 74 is coupled to the counter 80 to update the address value for the charge packet currently stored in charge sink 76.

In the operation of network 70, packets of charge $Q_1$ and $Q_2$ are loaded into the tapped delay line 72 under gates 72a and 72b, respectively. If $Q_1$ is larger than $Q_2$, output A of the flip-flop 74 is high, the transfer gate 78a is "on" and the transfer gate 78b is "off". As a result, packet $Q_2$ will remain in the delay line 72 and $Q_1$ is discarded (i.e. transferred to charge sink 76). Alternatively, if $Q_1$ is smaller than $Q_2$, the transfer gate 78b is "on" and the gate 78a is "off". Under these conditions, $Q_1$ is retained and $Q_2$ is discarded (i.e. transferred to charge sink 76). In a serial mode, the retained smaller charge packet is shifted under gate 72a and a new charge packet $Q_3$ is loaded under gate 72b. The whole procedure repeats until the last charge packet in the succession passes through network 70. The digital counter 80 is updated as required to identify the source (i.e. time of arrival) of the stored packet. Whenever the flip-flop 74 output A signals a new charge packet is smaller than the currently stored minimum, the number in the counter 80 updates a buffer 82 which saves the address of the minimum charge packet. Thus, network 70 not only selects the smallest charge packet, but also records its location.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A full search block matching processor for determining the best matching $m \times n$ element subarray of an $M \times N$ element array with an $m \times n$ element template, where $m \leq M$ and $n \leq N$, comprising:

A. a charge domain tapped delay line including:
   i. at least $(m \times n) + (m-1) \times (N-n)$ stages and having a serial input channel and m groups of n parallel output channels, each of said n output channels in each group being coupled to an associated one of n successive stages in a corresponding group of stages in said delay line, wherein each of said groups of n successive stages in said delay line are separated by $N-n$ successive stages in said delay line,
   ii. means for establishing a succession of at least $m \times n$ charge packets in said delay line in response to a succession of applied input signals, each of said packets having a magnitude corresponding to an associated one of a corresponding succession of elements of said array,
   iii. means for shifting said charge packets from stage-to-stage along said delay line at an input rate, and
   iv. N floating gate sensing electrodes, each of said electrodes overlying one of said stages and being adapted to provide a potential thereon representative of the magnitude of a charge packet currently within its underlying stage, said potential being a search signal associated with said electrode, B. a template network including:
   i. a charge storage region and an associated means for establishing a succession of $m \times n$ charge packets in said storage region at said input rate, each of said packets having a magnitude corresponding to an associated element in said template,
   ii. a floating gate sensing electrode overlying said storage region and being adapted to provide a potential thereon representative of the magnitude of a charge packet currently underlying said electrode, said potential being a template signal, C. m groups of n charge domain absolute magnitude difference (AMD) networks, each of said AMD networks:
  i. having a template input port, a search input port, and a charge domain output port, wherein each of the n AMD networks of each of said groups has its search input port coupled to an associated sensing electrode of an associated group of said output channels of said delay line, and has its template input port coupled to said sensing electrode of said template network,
  ii. each of said AMD networks includes means for providing at its output port a succession of charge packets at said input rate, each of said charge packets being representative of the absolute magnitude of the difference between the current one of said search signals at its search input port and the current one of said template signals at said template input port, D. m groups of n charge domain summing networks, each of said summing networks:
  i. being associated with an AMD network in an associated one of said m groups of AMD networks, and
  ii. including means for providing at an output thereof a succession of output charge packets at a summing rate equal to $1/(m \times n)$ times said input rate, each of said output charge packets having a magnitude representative of the sum of the magnitude of $m \times n$ successive charge packets provided at said output port of said associated AMD network, E. m charge domain row accumulator networks, each row accumulator network:
  i. being associated with one of said m groups of n AMD networks, and
  ii. including means for substantially simultaneously receiving said output charge packets of its associated n summing networks at distinct locations in said row accumulator network, and
  iii. means for transferring said received charge packets to establish a succession of said output charge packets at an output port thereof at an accumulator rate equal to 1/m times said input rate, F. m charge domain row minimum difference (MD) networks, each row MD network:
  i. being associated with one of said m row accumulator networks, and
  ii. including means for storing a charge packet therein, and
  iii. including means for receiving said succession of said output charge packets one at a time at said accumulator rate, and means operative at the receipt of each of said charge packets for retaining and storing only the smaller magnitude one of said just received charge packet and a previously stored charge packet, G. a charge domain column accumulator network, said column accumulator network:
  i. being associated with said m row MD networks, and
  ii. including means for substantially simultaneously receiving said stored charge packets of said m row MD networks at distinct locations in said column accumulator network, and
  iii. means for transferring said received charge packets to establish a succession of output charge packets at an output port thereof at a rate equal to said accumulator rate, and H. a charge domain column minimum difference (MD) network, said column MD network:
  i. being associated with one of said column accumulator networks, and
  ii. including means for storing a charge packet therein, and
  iii. including means for receiving said succession of said output charge packets one at a time at said accumulator rate, and means operative at the receipt of each of said charge packets for retaining and storing only the smaller magnitude one of said just received charge packet and the next previously stored charge packet, whereby the magnitude of said charge packet stored at said column MD network is representative of said best matching $m \times n$ subarray of said elements that have been represented by charge packets in said delay line.

2. A processor according to claim 1 further comprising:
identifying means for identifying which $m \times n$ charge packet of said charge packets established in said delay line generates said stored charge packet in said column MD network.

3. A processor according to claim 2 wherein said identifying means includes:
means for identifying the AMD network which provides the minimum magnitude charge packet of said charge packets provided by its associated n row MD networks for each set of $m \times n$ input clock rate pulses, and
means for identifying the row MD network which provides the minimum magnitude charge packet of said charge packets provided by said m row MD networks.

4. A processor according to claim 1 wherein $N=31$, $M=31$, $m=16$ and $n=16$.

5. A full search block matching processor for determining the best matching $m \times n$ element subarray of an $M \times N$ element array with an $m \times n$ element template, where $m \leq M$ and $n \leq N$, comprising:
A. a charge domain tapped delay line including:
  i. at least $(m \times n)+(m-1) \times (N-n)$ stages and having a serial input channel and m groups of n parallel output channels, each of said n output channels in each group being coupled to an associated one of n successive stages in a corresponding group of stages in said delay line, wherein each of said groups of n successive stages in said delay line are separated by N-n successive stages in said delay line,
  ii. means for establishing a succession of at least $m \times n$ charge packets in said delay line in response to a succession of applied input signals, each of said packets having a magnitude corresponding to an associated one of a corresponding succession of elements of said array,
  iii. means for shifting said charge packets from stage-to-stage along said delay line at an input rate, and
  iv. N floating gate sensing electrodes, each of said electrodes overlying one of said stages and being adapted to provide a potential thereon representative of the magnitude of a charge packet currently within its underlying stage, said potential being a search signal associated with said electrode, B. a template network including:
  i. a charge storage region and an associated means for establishing a succession of $m \times n$ charge packets in said storage region at said input rate, each of said packets having a magnitude corresponding to an associated element in said template,
  ii. floating gate sensing electrode overlying said storage region and being adapted to provide a potential thereon representative of the magnitude of a charge packet currently underlying said electrode, said potential being a template signal, C. m groups of n charge domain absolute magnitude difference (AMD) networks, each of said AMD networks:
  i. having a template input port, a search input port, and a charge domain output port, wherein each of the n AMD networks of each of said groups has its search input port coupled to an associated sensing electrode of an associated group of said output channels of said delay line, and has its template input port coupled to said sensing electrode of said template network,
  ii. each of said AMD networks includes means for providing at its output port a succession of charge packets at said input rate, each of said charge packets being representative of the absolute magnitude of the difference between the current one of said search signals at its search input port and the current one of said template signals at its template input port, D. m groups of n charge domain summing networks, each of said summing networks:
  i. being associated with an AMD network in an associated one of said m groups of AMD networks, and
  ii. including means for providing at an output thereof a succession of output charge packets at a summing rate equal to $1/(m \times n)$ times said input rate, each of said output charge packets having a magnitude representative of the sum of the magnitude of $m \times n$ successive charge packets provided at said output port of said associated AMD network, E. m charge domain row accumulator networks, each row accumulator network:
  i. being associated with one of said m groups of n AMD networks, and
  ii. including means for substantially simultaneously receiving said output charge packets of its associated n summing networks at distinct locations in said row accumulator network, and
  iii. transferring said received charge packets to establish a succession of said output charge packets at an output port thereof at an accumulator rate equal to $1/m$ times said input rate, F. a charge domain column accumulator network, said column accumulator network:
  i. being associated with said m row accumulator networks, and
  ii. including means for substantially simultaneously receiving said succession of output charge packets of said m row accumulator networks at distinct locations in said column accumulator network, and
  iii. means for transferring said received charge packets to establish a succession of output charge packets at an output port thereof at a rate equal to said input rate, and G. a charge domain column minimum difference (MD) network, said column MD network:
  i. being associated with said column accumulator network, and
  ii. including means for storing a charge packet therein, and
  iii. including means for receiving said succession of said output charge packets one at a time at said input rate, and means operative at the receipt of each of said charge packets for retaining and storing only the smaller magnitude one of said just received charge packet and the next previously stored charge packet, whereby the magnitude of said charge packet stored at said column MD network is representative of said best matching $m \times n$ subarray of said elements that have been represented by charge packets in said delay line.

6. A processor according to claim 5 further comprising:
  identifying means for identifying which $m \times n$ charge packet of said charge packets established in said delay line generates said stored charge packet in said column MD network.

7. A processor according to claim 6 wherein said identifying means includes:
  means for identifying the AMD network which provides the minimum magnitude charge packet of said charge packets provided by its associated n row MD networks for each set of $m \times n$ input clock rate pulses, and means for identifying the row MD network which provides the minimum magnitude charge packet of said charge packets provided by said m row MD networks.

8. A processor according to claim 5 wherein $N=31$, $M=31$, $m=16$ and $n=16$.

* * * * *

UNITED STATES PATENT AND TRADEMARK OFFICE
CERTIFICATE OF CORRECTION

PATENT NO.  : 5,030,953
DATED       : July 9, 1991
INVENTOR(S) : Alice M. Chiang It is certified that error appears in the above-identified patent and that said Letters Patent is hereby corrected as shown below:

Column 1, line 4 add the following

--This invention was made with Government support under Contract Number F19628-85-C-0002 awarded by the the U.S. Air Force. The Government has certain rights in the invention.--

Signed and Sealed this

Sixteenth Day of November, 1993

Attest:

BRUCE LEHMAN

Attesting Officer

Commissioner of Patents and Trademarks